United States Patent [19]

Kaneda

[11] Patent Number: 5,396,159
[45] Date of Patent: Mar. 7, 1995

[54] METHOD OF STARTING A MOTOR

[75] Inventor: Isao Kaneda, Moriyama, Japan

[73] Assignee: Nippon Densan Corporation, Japan

[21] Appl. No.: 118,563

[22] Filed: Sep. 9, 1993

[30] Foreign Application Priority Data

Sep. 11, 1992 [JP] Japan .................. 4-243550
Sep. 21, 1992 [JP] Japan .................. 4-250904
Oct. 22, 1992 [JP] Japan .................. 4-284346

[51] Int. Cl.$^6$ .............................................. H02P 1/18
[52] U.S. Cl. ..................................... 318/431; 318/254
[58] Field of Search ............... 318/138, 254, 430, 431, 318/778

[56] References Cited

U.S. PATENT DOCUMENTS

| | | | |
|---|---|---|---|
| 3,739,248 | 6/1973 | Wehde | 318/138 |
| 4,097,788 | 6/1978 | Nygaard et al. | 318/415 |
| 4,251,758 | 2/1981 | Pedersen et al. | 318/254 |
| 4,876,491 | 10/1989 | Squires et al. | |
| 4,879,498 | 11/1989 | Shinohara et al. | 318/254 |
| 4,928,043 | 5/1990 | Plunkett. | |
| 5,019,756 | 5/1991 | Schwarz. | |
| 5,191,270 | 3/1993 | McCormack | 318/254 |
| 5,225,759 | 7/1993 | Endo et al. | 318/778 |
| 5,235,264 | 8/1993 | Kaneda et al. | |
| 5,298,838 | 3/1994 | Peters et al. | 318/138 |

*Primary Examiner*—Bentsu Ro

[57] ABSTRACT

A method of starting a motor comprising a first starting step of supplying an exciting current to armature coils, a first holding step for holding the exciting current after the first starting step, a second starting step of supplying an exciting current to the armature coils after the first holding step, a second holding step of holding this exciting current after the second starting step, and a third starting step of supplying an exciting current to the armature coils after the second holding step. In this method, the frequency $f_1$ of the first holding step is larger than the characteristic frequency $F_0$ of the rotation system of the motor ($f_1 > F_0$) and the frequency $f_2$ of the second holding step is smaller than the characteristic frequency $F_0$ of the rotation system ($f_2 < F_0$).

21 Claims, 11 Drawing Sheets

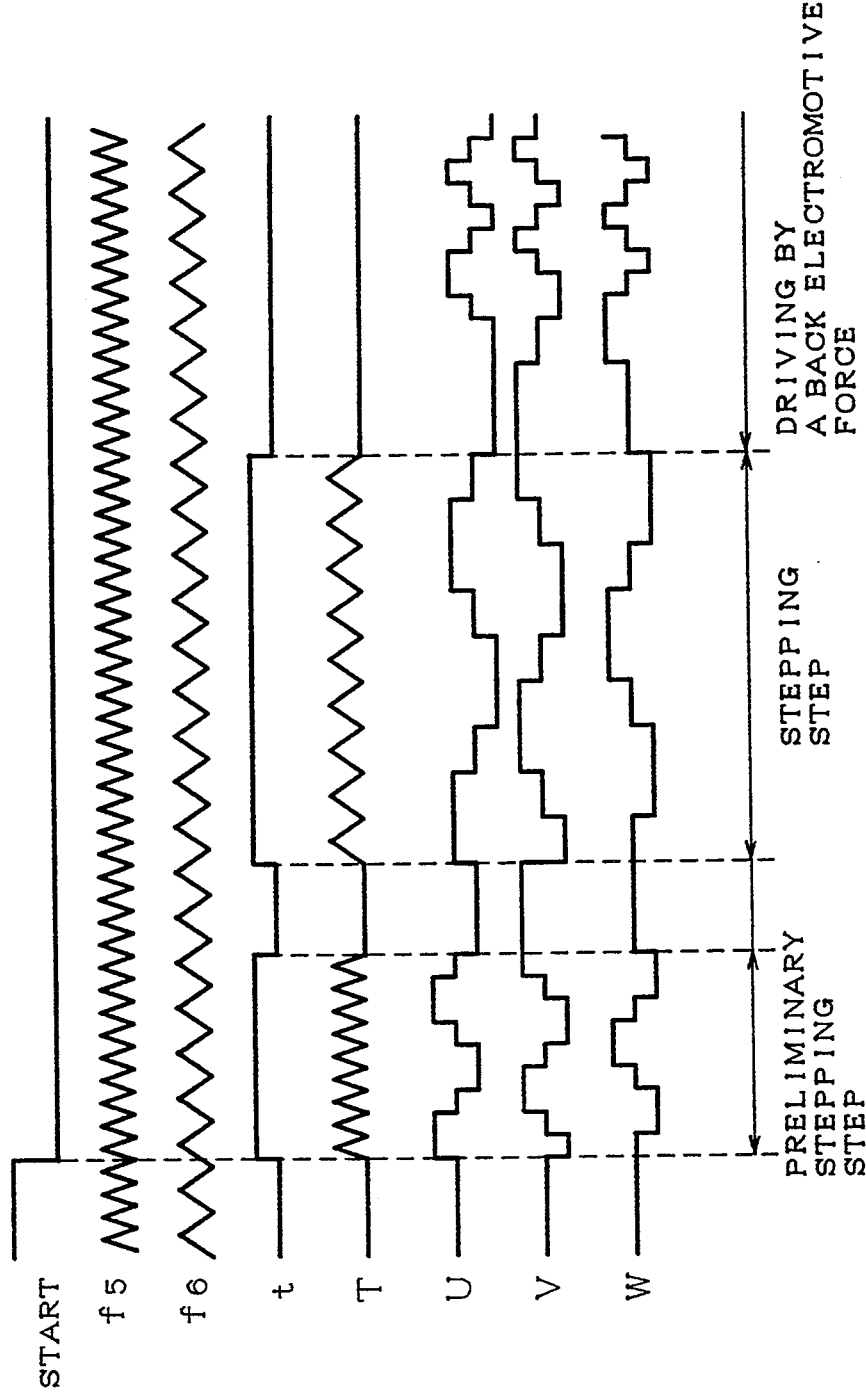

METHOD OF STARTING A MOTOR

FIELD OF THE INVENTION

This invention relates to a method of starting a motor, especially that may be applied conveniently to a sensorless polyphase direct current motor.

DESCRIPTION OF THE RELATED ART

DC motors for rotating and driving recording disks such as a magnetic disk or an optical disk are used. Motors of this type are generally provided with a housing, a rotor free to rotate relative to the housing, a permanent magnet mounted on the rotor, and a stator disposed in opposition to the permanent magnet, and this stator has a stator core and an armature coil wound on the stator core as required. Furthermore, a sensor (such as a hall element) for detecting a rotating angular position of the rotor is provided, and a signal from the sensor controls an electric current supplied to the armature coil.

In recent years, in order to avoid the smaller sizing of motors or the degeneration of the characteristics of the sensor, so-called sensorless motors which detect the position of a rotor magnet by utilizing an induced voltage generated in a coil to which an electric current is not supplied without using a sensor become generalized. Since in this sensorless motor a back electromotive force cannot be obtained at the time of rotation and stopping of the rotor, a stepping step of a predetermined pattern is carried out. For example, in a three-phase coil motor, a stepping step for successively supplying a exciting current to the armature coil of the stator is repeatedly carried out. This stepping step usually includes a mode of flowing an exciting current in the positive direction, the cessation, and the reverse direction to each step. However, this sensorless motor had the following technical problems in the method of starting. In the sensorless motor, the position of the rotor magnet is detected by the induced voltage in a magnetic flux which links to the coil. But at the time of stoppage of the motor, there is no induced voltage, and the polarity of the magnet is not known. Accordingly, at the time of starting, starting is forcibly performed. However, depending upon the position of the rotor, a large rotation torque cannot be obtained at the time of starting, and therefore, a poor starting may occur, or a magnetic field may occur in a reverse direction by eletrification to develop inverse rotation.

To solve the above problem residing in the sensorless motor, the applicant proposed a new method of starting a motor disclosed in U.S. Pat. No. 5,235,264. However, in this proposed starting method, there are still problems to be solved, such as (1) when it is applied to various motors, a poor starting of the motors will occur although with a very little probability, and (2) since a stepping step is carried out two times, it cannot satisfactorily cope with small electrification in recent years.

SUMMARY OF THE INVENTION

An object of the invention is to provide a method of starting a motor by which the starting characteristics of the motor can be promoted.

Another object of the invention is to provide a method of starting a motor, in which a consumption electric power at the time of starting can be decreased.

A further object of the invention is to provide a method of starting a motor, which can be applied conveniently to a motor equipped with fluid dynamic bearings.

The other objects and characteristics of the present invention will be readily understood from the following description.

BRIEF DESCRIPTION OF THE DRAWINGS

FIG. 12 is a time chart of the control system of FIG. 11.

DETAILED DESCRIPTION OF THE PREFERRED EMBODIMENTS

With reference to the accompanying drawings, the invention will be further described.

Figure 1:
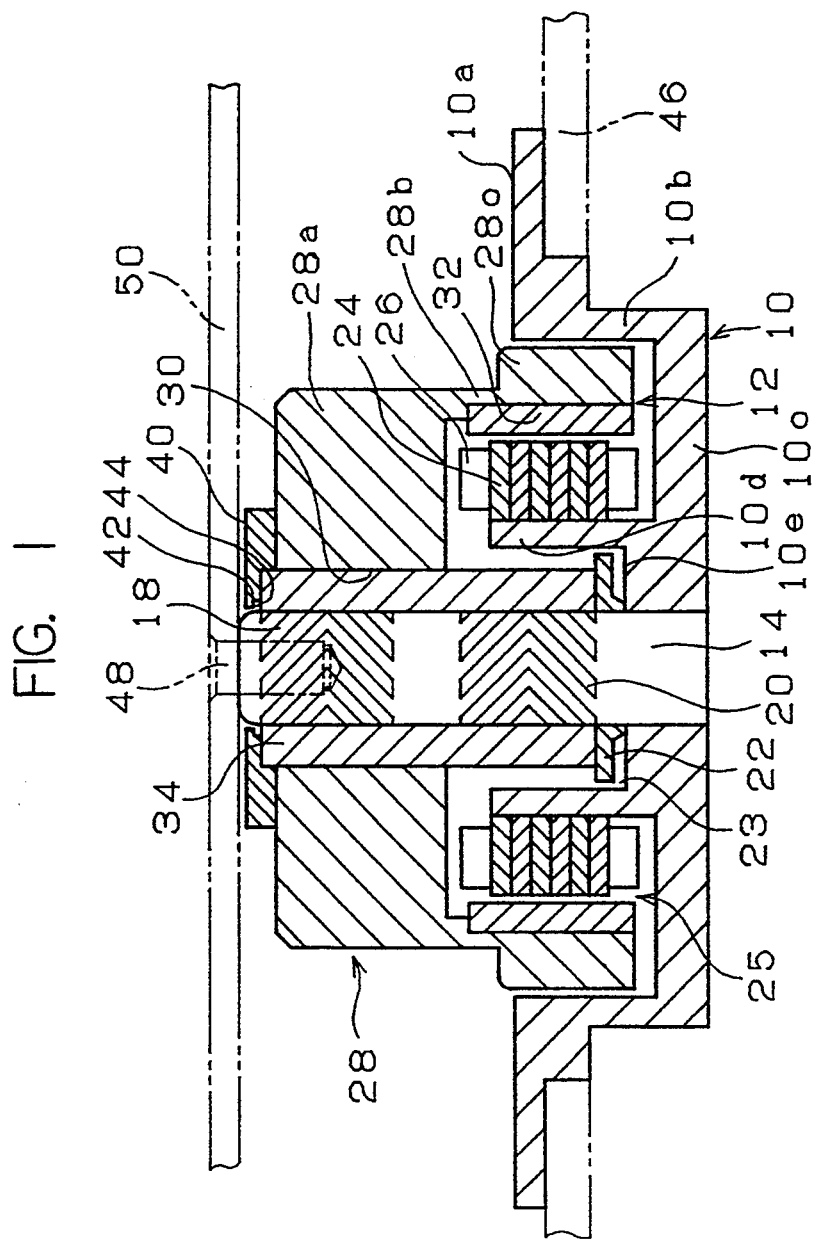
FIG. 1 is a sectional view of one example of the motor to which the method of starting a motor in accordance with this invention is applied.

First, with reference to FIG. 1, a spindle motor as one example of the motor will be described. The illustrated spindle motor is a three-phase DE motor and has a bracket (housing 10) whose sectional surface is formed in a concave shape. The bracket 10 has a ring-shaped flange portion 10a provided on the outer periphery, an outer peripheral wall portion 10b positioned in its inside, an annular first bottom portion 10c formed in the lower portion of the outer peripheral wall portion 10b, an inside peripheral wall portion 10d provided inwardly of the bottom portion 10c, and an annular second bottom portion 10e formed inwardly of the inner peripheral wall portion 10d. The lower end portion of a cylindrical fixed strut 14 is inserted and fixed at the center of the second bottom portion 10e of the bracket 10. A pair of herringbone grooves 18 and 20 are engraved at a predetermined distance axially of the outer peripheral surface of the fixed strut 14. In FIG. 1, the herringbone grooves 18 and 20 are shown in a simplified manner in a state in which the outer peripheral surface of the fixed strut 14 is developed in a plane. A ring-shaped thrust bearing member 22 is inserted and fixed at the lower end portion of an upwardly projected portion from the second bottom portion 10e at the fixed strut 14.

The thrust bearing member 22 is formed in a smaller outside diameter than the inner peripheral diameter of the inner peripheral wall portion 10d, and a downwardly projecting portion is formed in its inner peripheral portion. This bearing member 22 is provided such that its projecting portion is fixed to the fixed strut 14 so as to abut on the second bottom portion 10e. Between its lower surface and the second bottom portion 10e, a space 23 for reserving a lubricant oil is formed. A spiral groove (not shown) is formed on the upper surface of the thrust bearing member 22.

A stator 25 is disposed on the outer peripheral surface of the inner peripheral wall portion 10d of the bracket 10. The stator 25 has a stator core 26, and on this stator core 26, three-phase armature coils 26 (u, v, w) are wound. A rotor 28 is rotatable relatively to the bracket 10. The rotor 28 has a base portion 28a the central portion through which an insertion hole 30 penetrates, an outer wall portion 28b formed suspendedly on the outer periphery of the base portion 28a, and a bulging portion 28c formed bulgingly on the outside of the outer wall portion 28b, and a plurality of hard disks are fixed through spacers on the upper surface of the bulging portion 28c. A cylindrical magnet 32 is disposed at a position which is opposed to the stator core 24 on the inner peripheral surface of the outer wall portion 28b. This magnet 32 is fixed to the outer peripheral portion 28b.

A cylindrical rotating sleeve member 34 is fixed to the insertion hole 30 of the rotor 28. When the fixed strut 14 is inserted in the rotating sleeve member 34, the lower end of the rotating sleeve member 34 abuts on the thrust bearing member 22 and is supported rotatably. By filling a lubricating oil between the rotating sleeve member 34 and the fixed strut 14, a radial dynamic pressure bearing portion is formed between the herringbone grooves 18 and 20 and the inner peripheral portion of the rotating sleeve member 34, and simultaneously, a thrust dynamic pressure bearing portion is formed between the upper surface of the thrust bearing member 22 and the lower end surface of the rotating sleeve member 34.

A buffering member 40 is provided over the inner portion of the upper surface of the rotor 28 to the upper end surface of the rotation sleeve member 34. The upper end surface of the buffering member 40 is positioned above the upper end surface of the fixed strut 14. The inner peripheral portion of the buffering member 40 surrounds the outer peripheral surface of the fixed strut 14. An annular notched portion 42 is formed at a lower portion of the buffering member 40, and this notched portion 42 and the upper end surface of the rotating sleeve portion 34 form a lubricating oil reserving groove In the motor, the flange portion 10a of the bracket 10 is fixed to a base plate 46 of a hard disk driving apparatus, and the upper end portion of the fixed strut 14 is fixedly secured to a cover 50 of the driving apparatus.

Now, with reference to FIG. 2, a control system of the motor of FIG. 1 will be described. The illustrated control system is provided with a back electromotive force detecting circuit 101 which detects a back electromotive force induced in each armature coil u, v or w to which an exciting current is not supplied, and does not include a sensor for detecting the rotation position of the rotor 28. This control system has a control circuit 102 in which a detected signal from the back electromotive force detecting circuit 101 is inputted, a stepping signal generating circuit for supplying a stepping current to the control circuit 102 at the time of starting, a current switching logic connected to an output side of the control circuit 102 and an output driver 105.

Figure 3:
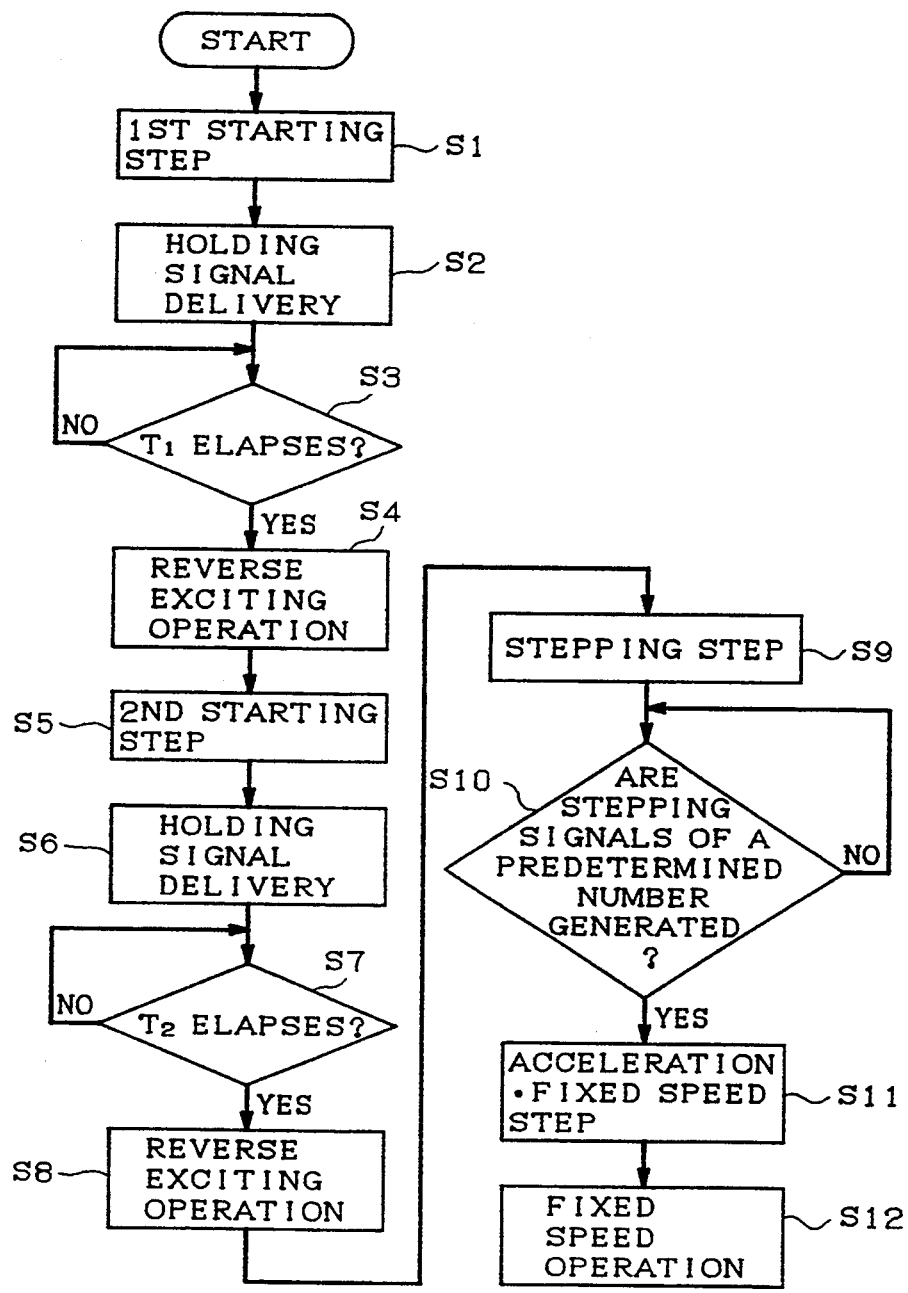
FIG. 3 is a flow chart showing a starting method in accordance with the control system of FIG. 2.
Figure 4:
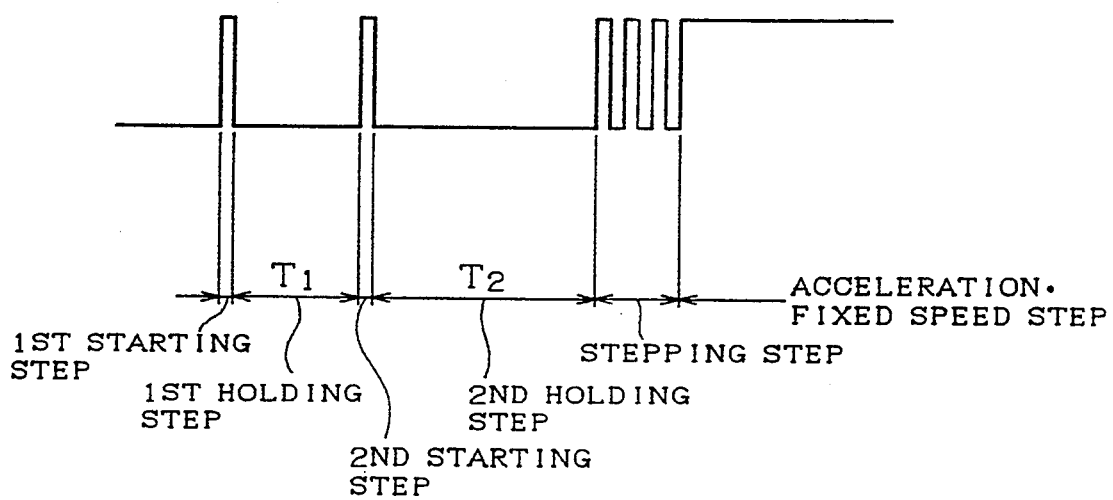
FIG. 4 is a time chart when a control is performed in accordance with the flow chart of FIG. 3.

The output driver 105 receives an output signal from the current switching logic 104 which operates on the basis of instructions from the control circuit 102, and an exciting current having a predetermined pattern is supplied to each armature coil u, v or w. The control circuit 102 performs a control of the starting of the motor and a steady operation after the starting on the basis of signals from the back electromotive force detecting circuit 101. FIG. 3 shows a control flow at the time of starting to be practiced in the control circuit 102. FIG. 4 shows a time chart at the time of starting practised in accordance with this control flow.

Figure 2:
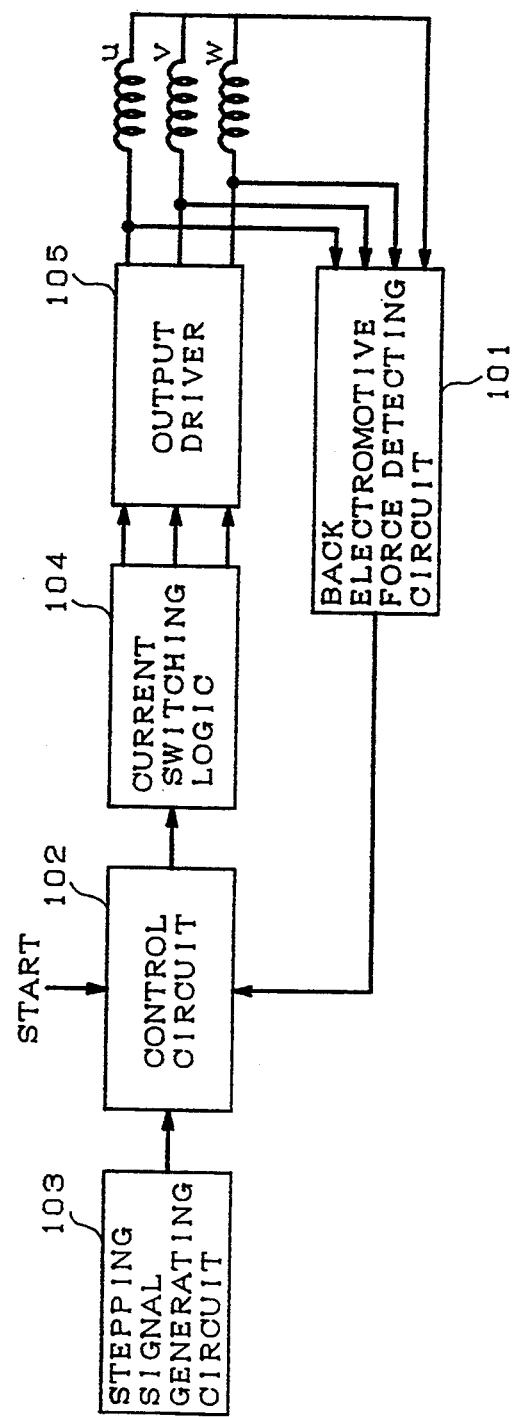
FIG. 2 is a block circuit diagram showing a motor control system which can be applied to the motor of FIG. 1.

With reference to FIGS. 2 and 3, when a start signal is inputted in the control circuit 102, a first starting step is performed in step s1. In this first starting step, an exciting current moving from the coil u to the coil v is supplied in the armature coils u and v, for example. In the following steps s2 and s3, the first holding step shown in FIG. 4 is practised. In step s2, a holding signal for maintaining the exciting current in the first starting step as it is sent from the control circuit 102 to the current switching logic 104, and in step s3, it is confirmed whether or not a first holding time T, elapsed.

In the following step s4, an exciting current held in the first holding step, without including a cessation time, performs a reverse exciting operation of reversing positive to negative, or negative to positive. Thereafter, in step s5, a second starting step is performed. For the details of this reverse exciting operation, see, for example, the specification and drawings of U.S. Pat. No. 5,235,264. In this second starting step, for example in armature coils u and v, an exciting current moving from coil v to coil u is supplied.

The following steps s6 and s7 are for performing the second holding step shown in FIG. 4. In step s6, a holding signal for maintaining an exciting current of the second starting step as it is sent out from the control circuit 102 to the current switching logic 104, and in step s7, it is confirmed whether or not a second holding time $T_2$ of the exciting current elapsed. Thereafter, in step s8, a reverse exciting driving operation is performed in the same way as in step s4.

Figure 5:
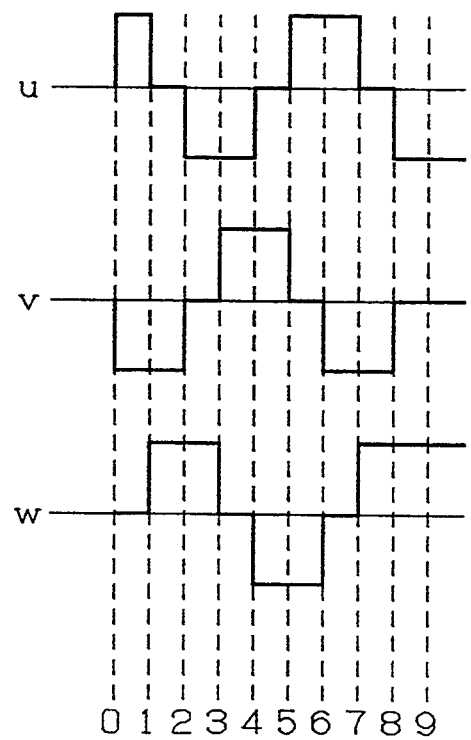
FIG. 5 is an explanatory view of a stepping step to be performed by the flow chart of FIG. 3.

The following steps s9 and s10 serve to perform a stepping step shown in FIG. 4. In this stepping step, an exciting current of a predetermined pattern is supplied to each armature coil u, v or w from the stepping signal generating circuit 103 based on the signal from the control circuit 102. FIG. 5 shows one example of such a stepping current. The stepping current shown in FIG. 5 comprises 9 internal stepping currents in which the direction of an exciting current is switched off in accordance with a consecutively prescribed pattern.

When it is confirmed that a stepping current signal of a predetermined number is generated in step s10, it then moves to step s11. In step s11, an accelerating-constant speed step is carried out based on the output signal of the back electromotive force detecting circuit 101, and thereafter, it moves to a constant speed operation (step s12).

In the above control flow, the present embodiment has a marked characteristic in what is stated in the following description. The frequency $f_1$ ($\frac{1}{2}T_1$) of the first holding step carried out in steps s2 and s3 and the frequency $f_2$ ($\frac{1}{2}T_2$) of the second holding step carried out in the steps s6 and s7 are prescribed so that they satisfy the following relationship with respect to the characteristic frequency $F_0$ of the rotating system of the sensorless motor. Namely, the frequency $f_1$ of the first holding step is larger than the characteristic frequency $F_0$ of the rotation system, and this characteristic frequency $F_0$ is larger than the frequency $f_2$ in the second holding step ($f_1 > F_0 > f_2$).

When the frequency or holding time are prescribed so that this relation should be satisfied, the frequency $f_1$ ($\frac{1}{2}T_1$) of the first holding step is larger than the characteristic frequency $F_0$ of the rotation system of the motor. Accordingly, a driving force toward a proceeding side is developed in the rotation system of the motor, and inverse rotation is prevented in the first driving (the first starting step and the first holding step). Furthermore, in the second starting (the second starting step and the second holding step), the frequency $f_2$ ($\frac{1}{2}T_2$) in the second holding step becomes smaller than the characteristic frequency $F_0$ of the rotation system of the motor. Thus, a driving force on a retarding side acts on the rotation system of the motor, and the rotation of the motor is exactly carried out.

In this case, if the frequency $f_1$ ($\frac{1}{2}T_1$) of the first holding step is adjusted to less than the characteristic frequency $F_0$ of the rotation system of the motor, the rotation system of the motor becomes a retarding side in the early period. Accordingly, the motor has a great possibility of rotating reversely. Furthermore, in this specific embodiment, a reverse exciting operation in which a supply current to an armature coil is reversed without containing a cessation period between the first holding step and the second starting step and between the second holding step and the stepping step is included. Thus, by the performance of this operation, the starting force of the motor increases. The probability of starting becomes very large, and the starting reliability of the motor further increases.

Since the reverse exciting operation in this embodiment is employed in order to further increase the starting reliability of the motor, this operation is not always necessary. Furthermore, in this first embodiment, a stepping step is performed after the second holding step. In place of this stepping step, a third starting step (furthermore, a plurality of starting steps) may be repeated in which in the same way as in the first starting step, an exciting current may he supplied may be carried out. Thereafter, an acceleration to a steady speed step may be carried out. In such a case, without using the stepping signal generation circuit 103, only an internal control may be carried out with the use of the control circuit 102.

Figure 6:
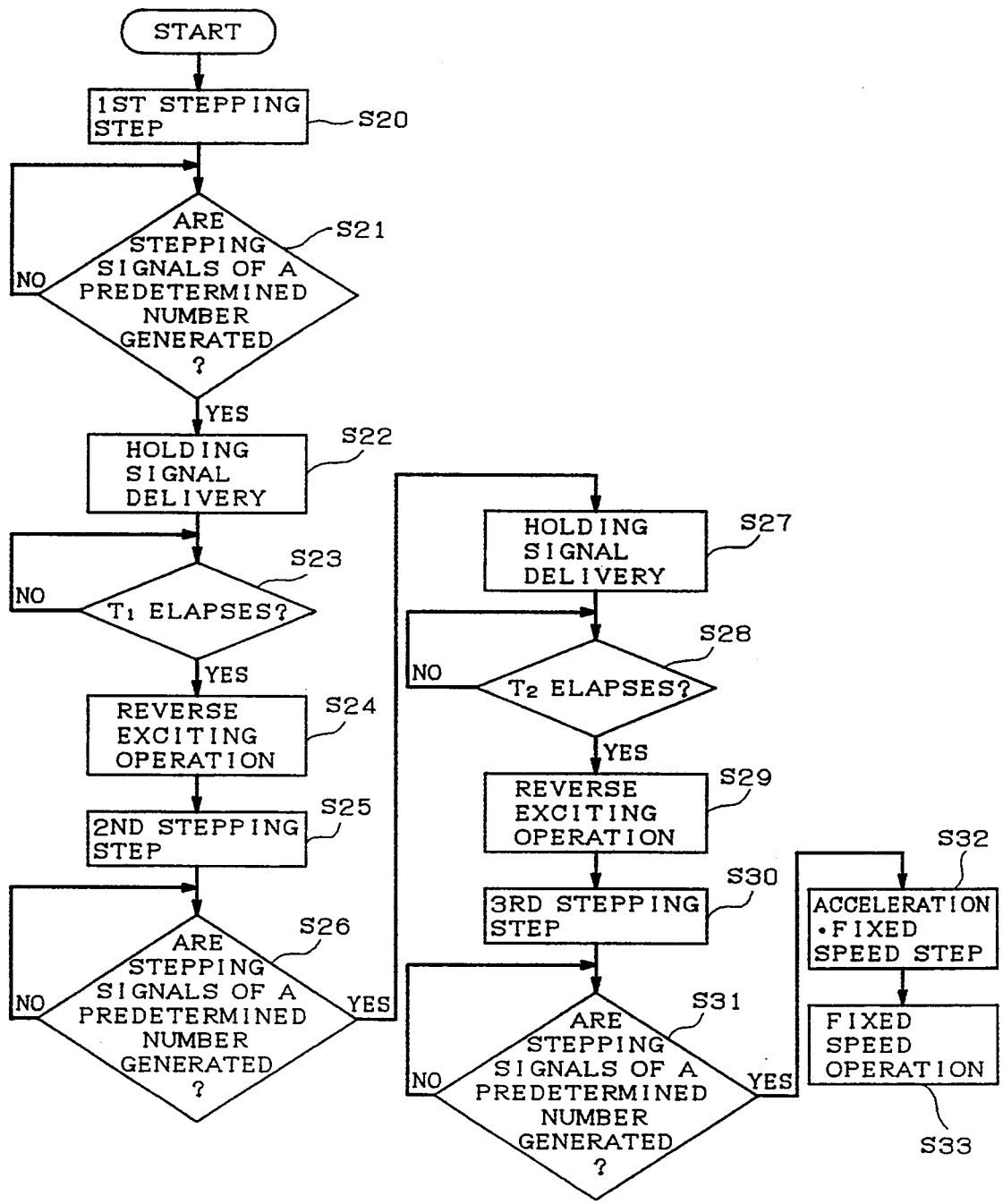
FIG. 6 is a flow chart showing a second specific example of a method of starting a motor.
Figure 7:
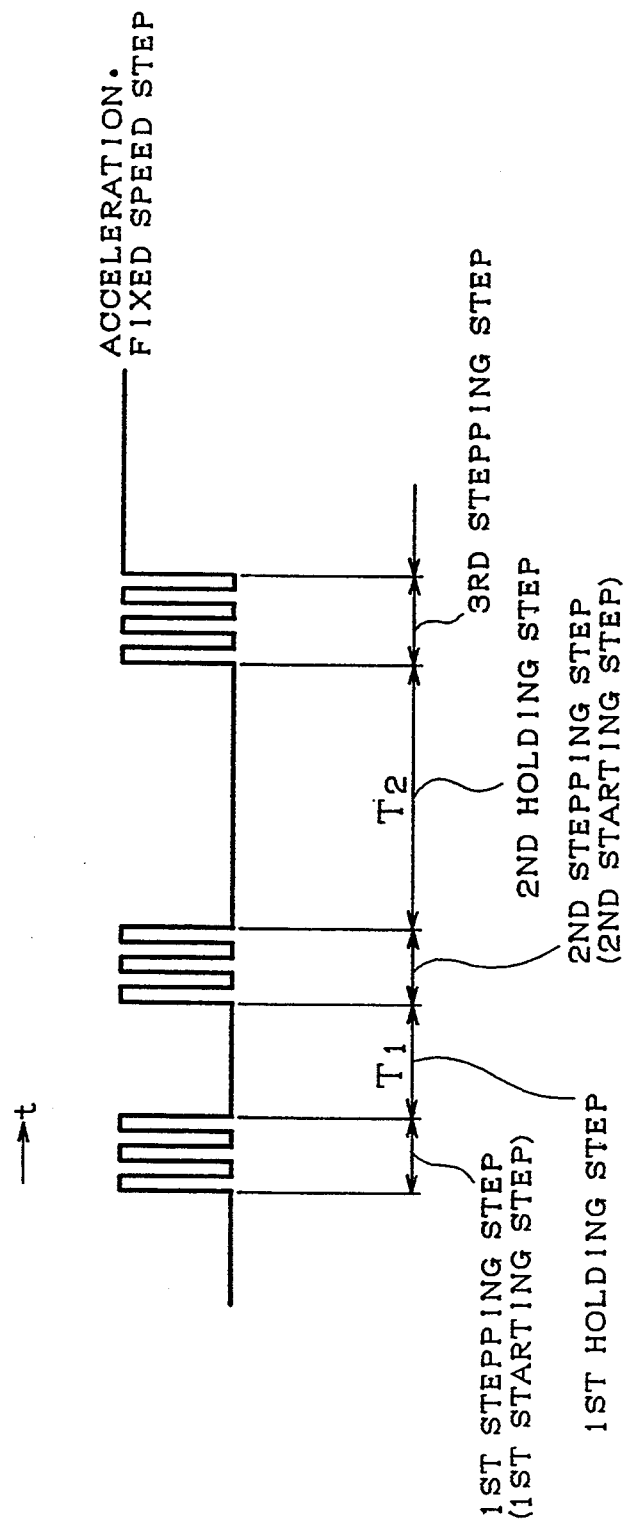
FIG. 7 is a time chart when a control is performed in accordance with the flow chart of FIG. 6.

FIGS. 6 and 7 illustrate a second specific embodiment of the method of starting the sensorless motor. The construction of the control system in this specific embodiment may he the same as shown in FIG. 2. FIG. 6 is a control flow at he time of starting to be practised in the control circuit 102. FIG. 7 is a time chart at the time of starting carried out by using the control flow mentioned above.

The control flow practised in this specific embodiment shows that in the same way as in the first specific embodiment, when a start signal is inputted in the control circuit 102, a first stepping step as a first starting step is carried out in steps s20 and s21. In this first stepping step, an exciting current in which nine internal steppings are successively repeated, as shown in FIG. 5 for example, is supplied to each armature coil u, v or w from the stepping signal generating circuit 103 based on a signal of the control circuit 102, and it is confirmed whether or not a predetermined stepping signal is generated in step s21.

The following steps s22 and s23 serve to perform the first holding step shown in FIG. 7. In step s22, a holding signal for maintaining an exciting current supplied in the last internal stepping in the first stepping step is sent out to the current switching logic 104 from the control circuit 102. In step s23, it is confirmed whether or not a first holding time $T_1$ of the exciting current elapsed.

In the following step s24, a reverse exciting operation in which an exciting current held in the first holding step is reversed from positive to negative or from negative to positive without including a cessation time is carried out. Thereafter, in steps s25 and s26, a second stepping step is performed. In this second stepping step as a second starting step, an exciting current based on the same nine internal steppings as in step s20 is supplied. In step s26, the number of its generations is confirmed.

The following steps s27 and s28 serve to carry out a second holding step shown in FIG. 7. In step s27, a holding signal for maintaining the exciting current of the final internal stepping of the second stepping step as it is sent out to the current switching logic 104 from the control circuit 102. In step s28, it is confirmed whether or not a second holding time $T_2$ of the exciting current elapsed. Thereafter, in step s29, the same reverse exciting operation as in step s24 is carried out.

The following steps s30 and s31 serve to carry out a third stepping step shown in FIG. 7. In the third stepping step, a stepping current signal is supplied to each armature coil u, v or w in the same way as in the first and second stepping steps, and the number of its supply times is confirmed in step s31. When it is confirmed that stepping current signals of a predetermined number are generated in step s31, step s31 is transferred to step s32. In step s32, an accelerating-constant speed step is carried out based on the output signal of the back electromotive force detecting circuit 101, and then it is transferred to a constant speed operation (step s33).

In the above-mentioned control flow, it is prescribed in this specific embodiment that the frequency $f_1$ ($\frac{1}{2}T_1$) of the first holding step carried out in steps s22 and s23 becomes larger than the characteristic frequency $F_0$ of the rotation system of the motor and the frequency $f_2$ ($\frac{1}{2}T_2$) of the second holding step carried our in steps s27 and s28 becomes smaller than the characteristic frequency $F_0$ of the rotation system of the motor ($f_1 > F_0 > f_2$).

This relationship of frequencies is more specifically stated. For example, in a rotation system of a hard disk apparatus containing two 2.5 inch disks, since its characteristic frequency $F_0$ is about 40 Hz, it is prescribed that the frequency $f_1$ ($\frac{1}{2}T_1$) of the first holding step is about 150 Hz and the frequency $f_2$ ($\frac{1}{2}T_2$) is about 20 Hz.

In the starting method of this specific embodiment so constructed, the invention has the function and effect obtained in the first specific embodiment, and moreover, since the first starting step and the second starting step include a stepping step in which a stepping current of a predetermined pattern is supplied to each armature coil u, v, or w, the probability of starting the motor by this stepping step becomes great.

Figure 8:
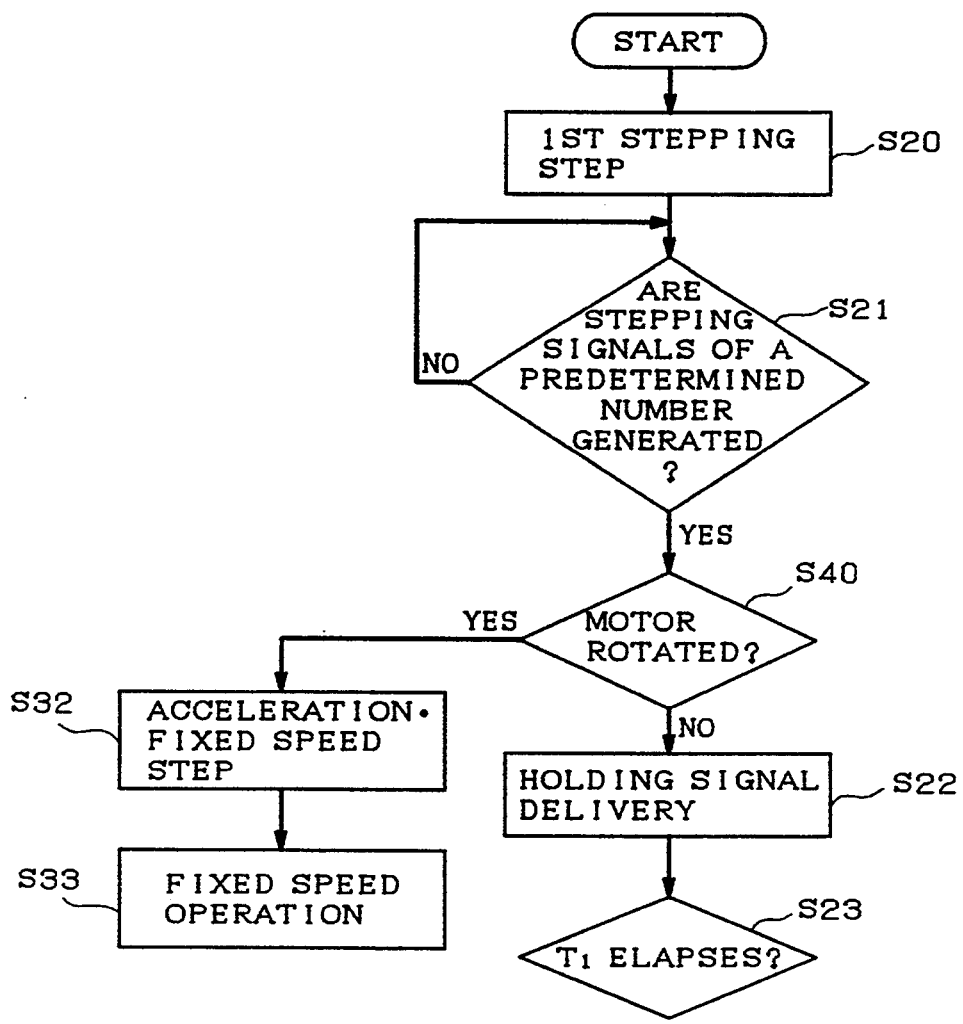
FIG. 8 is a flow chart showing a part of a modified example of the starting method of the second specific example.

FIG. 8 shows a part of a modified example of the starting methods shown in FIGS. 6 and 7. This starting method includes a step s40 in which it is judged whether or not the motor is started before the step s22 of sending a signal of the first holding step with respect to the specific embodiment shown in FIG. 6. When it is confirmed in step s40 that the rotor 28 is rotated until the rotation reaches a predetermined rotation number, the step is transferred to step s32, and an accelerating-constant speed step is carried out, and the second and third stepping steps are omitted. On the other hand, when it is judged that the rotation is not performed until the rotation number of the rotor 28 reaches, the step is transferred to step s23. Thereafter, the second stepping step is carried out. In addition to provide, the step is transferred to step s23. Thereafter, the second stepping step is carried out.

In addition to providing a step of judging whether or not the motor is started before the step 22s, or instead of providing that judging step before step s22, the judging step may be provided before step s26 of FIG. 6. When the above-mentioned step is provided, the step is transferred to step s32 if the rotor 28 rotates to a predetermined rotation number. Then, acceleration-steady speed step is carried out, and the third stepping step is omitted. On the other hand, when the rotor 28 is not rotated to a predetermined rotation number, the step is transferred to steps s27 and steps s28, and s29 and s30 follow, and the third stepping step is carried out.

The judgment of whether or not the motor is started depends on the zero-cross of the back electromotive force, the acceleration speed of the motor, or the number of revolutions of the motor in the first holding step. According to such a starting method of the sensorless motor, the function and effect mentioned in the specific embodiment are obtained, and in addition, when it is judged that the motor is fully started, the starting step is stopped thereafter. Accordingly, the consumed electric power required for the starting is decreased.

Figure 9:
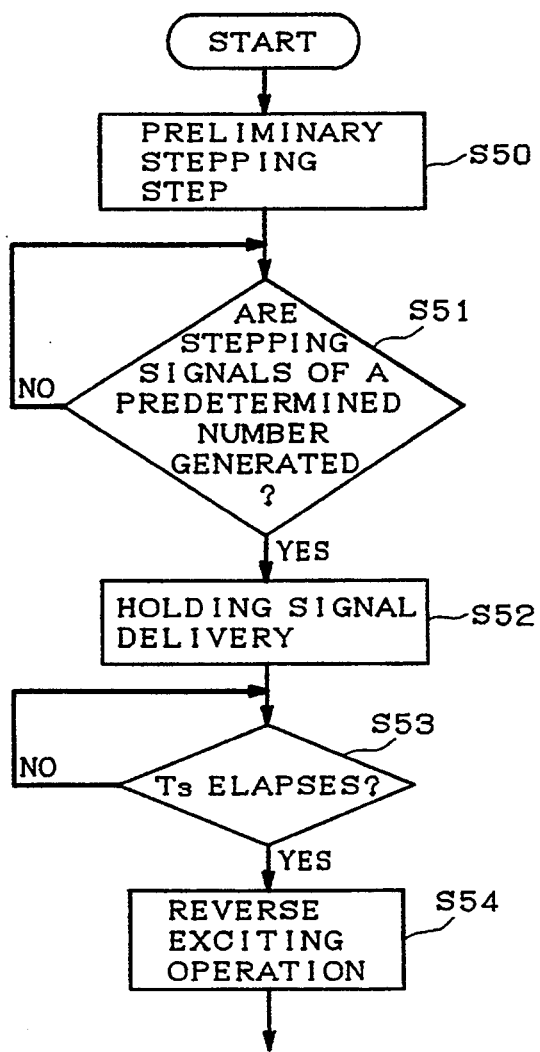
FIG. 9 is a flow chart showing a part of a second modified example of the starting method of the second specific example.
Figure 10:
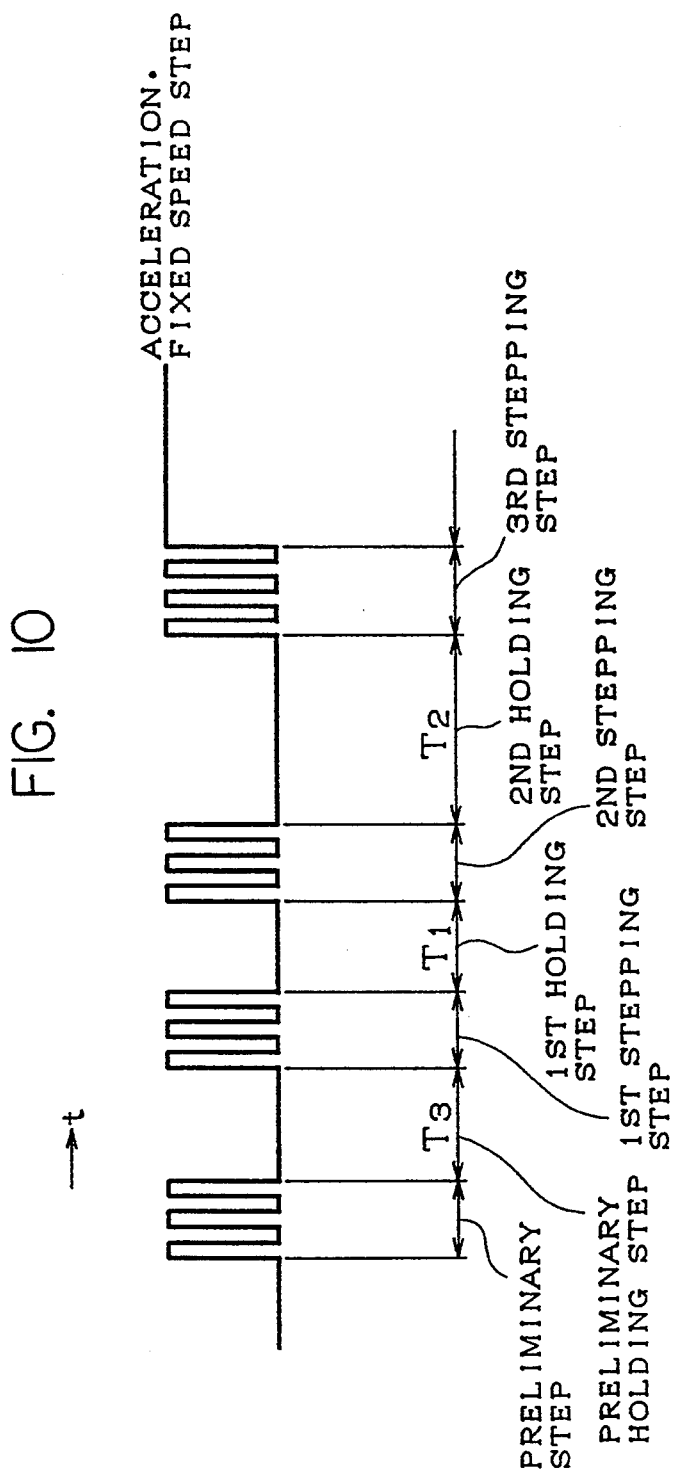
FIG. 10 is a time chart when a control is performed in accordance with the flow chart of FIG. 9.

FIGS. 9 and 10 show a second modified example of the starting method of the second specific embodiment. The construction of the control system used in this modified example is the same as that shown in FIG. 2. FIG. 9 is a control flow at the time of starting to be carried out in the control circuit 102. FIG. 10 is a time chart at the time of starting to be carried out in accordance with the above control flow.

The control flow to be carried out in this modified example is that in the same way as in the second specific embodiment, when a start signal is inputted into the control circuit 102, a preliminary stepping step is carried out in steps s50 and s51. In this preliminary stepping step, an exciting current in which nine internal steppings are consecutively repeated as shown in FIG. 5, for example is supplied to each armature coil u, v, or w from the stepping signal generating circuit 103 based on a signal of the control circuit 102, and it is confirmed whether or not a predetermined stepping signal is generated in step s51.

The following steps s52 and s53 serve to carry out a preliminary holding step shown in FIG. 10. In step s52, a holding signal for maintaining as it is an exciting current supplied in the last interior stepping of the preliminary stepping step is sent to the current switching logic 104 from the control circuit 102, and in step s53, it is confirmed whether or not a third holding time $T_1$ of the exciting current elapses.

In the following step s54, a reverse exciting operation tn which an exciting current held in the preliminary holding step reverses from positive to negative, or from negative to positive without including a cessation time is carried out. Thereafter, a control flow of steps s20 to s33 shown in FIG. 6 is carried out. In the present modified example in such a control flow, the frequency $f_3$ ($\frac{1}{2}T_s$) of the preliminary holding step to be carried out in steps s52 and s53, the frequency $f_1$ ($\frac{1}{2}T_1$) of the first holding step to be carried out in steps s22 and s23, and the frequency $f_2$ ($\frac{1}{2}T_2$) of the second holding step to be carried out in steps s27 and s28 are prescribed in the following relationship with respect to the characteristic frequency $F_0$ of the rotation system of the sensorless motor. Namely, the frequency $f_1$ of the first holding step is larger than the frequency $f_3$ of the preliminary holding step, the frequency $f_3$ of the preliminary holding step is larger than the characteristic frequency $F_0$ of the rotation system of the motor, and the frequency $f_2$ of the second holding step is smaller than the above characteristic frequency $F_0$ ($f_1 > f_3 > F_0 > f_2$).

In this starting method of the modified example, the function and effect are obtained as shown in the above specific embodiment, and moreover, the frequency $f_3$ ($\frac{1}{2}T_3$) of the preliminary holding step is about the same as the characteristic frequency of the head system containing a head and an arm. Accordingly, a rotating force is transmitted to the head via disks included in the rotation system in the preliminary starting (a preliminary starting step and a preliminary holding step), and this rotating force can make the head lifted from the disk surface. Accordingly, a head sticking is prevented, and the starting probability of the motor can be further increased.

Figure 11:
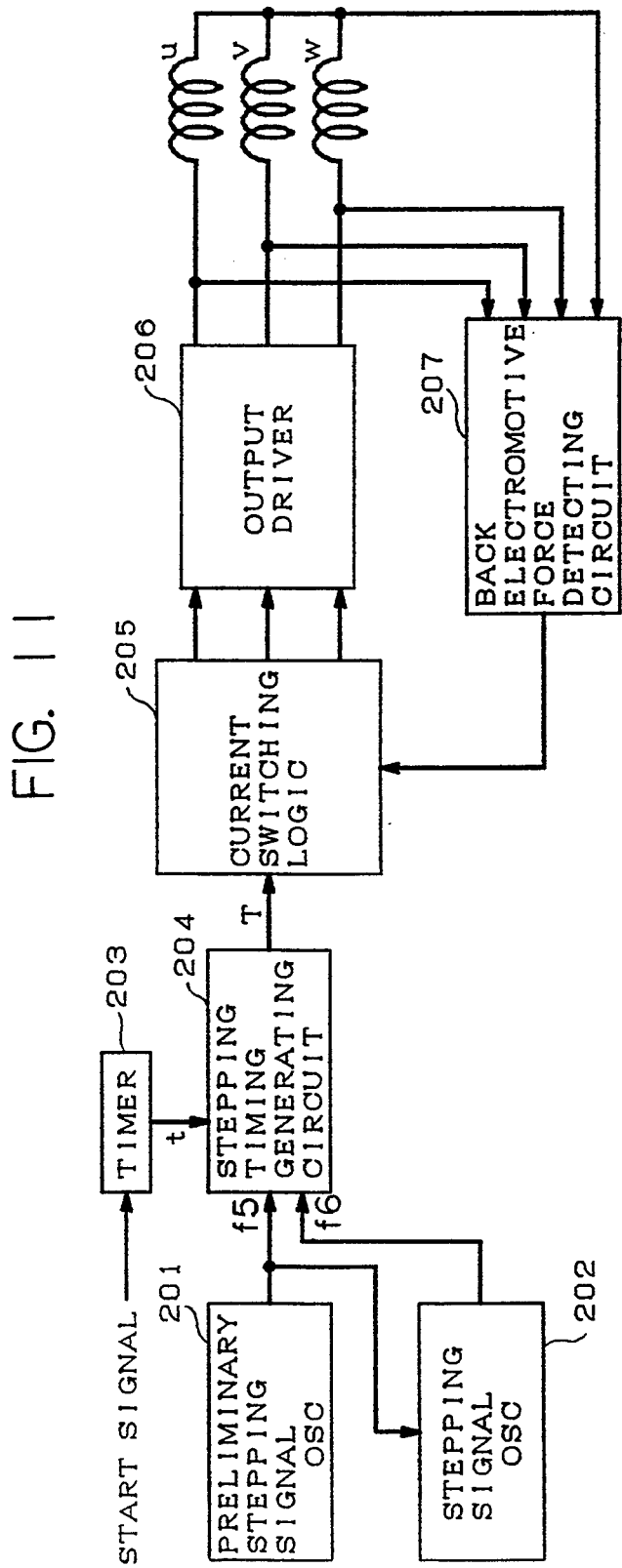
FIG. 11 is a block circuit diagram showing another example of a control system of a motor.

This preliminary stepping step may be provided prior to a usual starting method of a motor (a starting step consisting of a stepping step and an acceleration-steady speed step). In FIG. 11 showing another example of a control system of a motor, each armature coil u, v or w has a preliminary stepping signal oscillator 201, a stepping signal oscillator 202, a timer 203, a stepping timing generating circuit 204, a current switching logic 205, an output driver 206, and a back electromotive force detecting circuit 207. Three-phase armature coils u, v and w of the stator are connected to the output side of the output driver 206.

The preliminary stepping signal oscillator 201 sends a signal of 550 Hz which is about 10 times as high as the stepping signal oscillator 202. The stepping signal oscillator 202 demultiplies the frequency of an output signal of the preliminary stepping signal oscillator 201, and sends a signal of about 55 Hz having almost the same frequency as the characteristic frequency of the motor. The timer 203 sets up the time of a preliminary stepping section, a stepping operation section, or a cessation section.

The stepping timing generating circuit 204 receives the outputs of the preliminary stepping signal oscillator 201, the stepping signal oscillator 202, and the timer 203, and based on the time predetermined by the timer 203, a timing of sending output signals from these oscillators to the current switching logic 205 is adjusted. The current switching logic 205 serves to receive preliminary stepping signals and stepping signals from the stepping timing generating circuit 204 and switch the current flowing time and direction of coil u, v or w. The output driver 206 serves to supply an exciting current to a coil u, v or w. The back electromotive force detecting circuit 207 detects a back electromotive force from coils u, v and w and sends it to the current switching logic 205.

At the time of starting the motor, an exciting current in the state shown in FIG. 12 is supplied to a coil u, v or w. In the embodiment shown in FIG. 12, when a start signal is inputted into the timer 203, a preliminary stepping step is carried out for the time prescribed by the timer 203. The preliminary stepping step carried out herein is to excite a coil u, v or w based on the output signal from the preliminary stepping signal oscillator 201. The oscillated frequency of the preliminary stepping signal oscillator 201 at this time is prescribed at almost 10 times ($f_s$) as high as the oscillated frequency of the stepping signal oscillator 202.

When such a preliminary stepping step is completed, a cessation period of a predetermined time is provided, and then a stepping step is carried out in which an exciting current of almost the same frequency as the characteristic frequency of the rotation system of the motor is supplied. The stepping step practised here serves to excite the coil u, v or w based on the output signal from the stepping signal oscillator 202 which is obtained by demultiplying the output signal from the preliminary stepping signal oscillator 201 to about 1/10. The oscillated frequency of the stepping signal oscillator 202 at this time is prescribed at about the same frequency ($f_s$) as the characteristic frequency of the motor.

In this stepping step carried out after the preliminary stepping step, a reverse exciting operation in which an exciting current is reversed from positive to negative or from negative to positive in any of u, v and w (in FIG. 3, coil u) in the early period without including a cessation period is carried out. When this operation is carried out, the torque of the motor becomes very large, and the motor can be exactly started.

When the preliminary stepping step and the stepping step are carried out, the motor is started in a very small current with a high probability. When the rotor reaches a predetermined rotation, the back electromotive force is detected from the coil u, v or w by the back electromotive force detecting circuit 207. By subjecting the detected signal to a wave-form treatment, the synchronism of the rotor is controlled as in a direct-current motor of the conventional sensor type, and the rotation of the motor is carried out at a constant speed.

According to the above-mentioned method, before a stepping step of supplying an exciting current having the same frequency as the characteristic frequency of the rotation system of the motor to coil u, v or w, a preliminary stepping step of supplying an exciting current having a higher frequency than the above frequency to a stator coil u, v or w. Accordingly, slight vibrations are developed in the rotor. Hence, in a motor equipped with a dynamic pressure bearing as shown in FIG. 1, this slight vibrations decrease the viscosity of a lubricant oil of the dynamic pressure hearing portion, and make the starting of the motor easy and exact. Furthermore, by giving slight vibrations, the head floats from the recording disk, and a head sticking can be effectively prevented.

Although the specific embodiments of the method of starting a motor in accordance with this invention, the present invention will not be limited to these specific embodiments. They may be altered or varied without departing the range of this invention.

For example, the illustrated embodiments have been applied to a three-phase motor. But they may he applied to polyphase motors such as a two-phase motor or a four-phase motor.

What is claimed is:

1. A method of starting a motor equipped with a rotor having a permanent magnet and a stator having armature coils, which comprises a first starting step of supplying an exciting current to armature coils, a first holding step of holding the exciting current supplied to the armature coils for a first predetermined time ($T_1$) after the first starting step, a second starting step of supplying the exciting current to the armature coils after the first holding step, a second holding step for holding the exciting current supplied to the armature coils for a second predetermined time ($T_2$) after the second starting step, and a third starting step of supplying the exciting current to the armature coils after the second holding step, wherein the frequency $f_1$ ($\frac{1}{2}T_1$) of the first holding step is larger than the characteristic frequency $F_0$ of the rotation system of the motor ($f_1 > F_0$) and the frequency $f_2$ ($\frac{1}{2}T_2$) of the second holding step is smaller than the characteristic frequency $F_0$ of the rotation system of the motor ($f_2 < F_0$).

2. A method of starting a motor according to claim 1 wherein an acceleration-constant speed step of supplying a current for accelerating or rotating at a constant speed is supplied to the armature coils is carried out after the second holding step.

3. A method of starting a motor according to claim 1 wherein a reverse exciting current operation of reversing the exciting current supplied to the armature coils is carried out between the first holding step and the second starting step.

4. A method of starting a motor according to claim 3 wherein the second starting step is a stepping step of supplying a stepping current of a predetermined pattern to the armature coils.

5. A method of starting a motor according to claim 1 wherein a reverse exciting operation of reversing the exciting current supplied to the armature coils is carried out between the second holding step and the third starting step.

6. A method of starting a motor according to claim 5 wherein the third starting step is a stepping step of supplying a stepping current of a predetermined pattern to the armature coils.

7. A method of starting a motor according to claim 1 wherein before the first starting step, a preliminary starting step of supplying the exciting current to the armature coils and a preliminary holding step of holding the exciting current supplied to the armature coils for a third predetermined time ($T_3$) are carried out.

8. A method of starting a motor according to claim 7 wherein the frequency $f_3$ ($\frac{1}{2}T_3$) of the preliminary holding step is smaller than the frequency $f_1$ of the first holding step, and is larger than the characteristic frequency $F_0$ of the rotation system ($f_1 > f_3 > F_0$).

9. A method of starting a motor according to claim 7 wherein the preliminary starting step is a preliminary stepping step of supplying a preliminary stepping current of a predetermined pattern having a relatively high frequency to the armature coils.

10. A method of starting a motor according to claim 7 wherein a reverse exciting operation of reversing the exciting current to the armature coils is carried out between the preliminary holding step and the first starting step.

11. A method of starting a motor according to claim 2 wherein a first rotation number detecting step for detecting the rotation number of the rotor is provided between the first starting step and the second starting step, when it is determined that in the first rotation number detecting step, the rotor is rotating, the accelerating/constant speed step is carried out, and on the other hand it is determined that in the first rotation number detecting step, the rotor is not rotating, the second staring step is carried out.

12. A method of stating a motor according to claim 2, wherein a second rotation number detecting step for detecting the rotation number of the rotor is provided between the second staring step and the third staring step, when it is determined that in the second rotation number detecting step, the rotor is rotating, the accelerating/constant speed step is carried out, and on the other hand, when it is determined that the rotor is not rotating in the second rotation number detecting step, the third starting step is carried out.

13. A method of starting a motor according to claim 1 wherein a fluid dynamic pressure bearing is interposed between the rotor and the stator.

14. A method of starting a motor provided with a rotor having a permanent magnet and stator having armature coils, which comprises a first stepping step and a second stepping step for supplying a stepping current of a are determined pattern to the armature coils, and a rotation number detecting step provided between the first stepping step and the second stepping step, wherein when it is determined that the rotor is not rotating in the rotation number detecting step, the second stepping step is carried out, and on the other hand, when it is determined that the rotor is rotating in the rotation number detecting step, the second stepping step is omitted.

15. A method of starting a motor according to claim 14, further includes an accelerating/constant speed step for supplying a current for rotating the rotor at an accelerated speed/constant speed to the armature coils, and when it is determined that the rotor is rotating in the rotation number detecting step, the accelerating/constant speed step is carried out after the first stepping step.

16. A method of starting a motor according to claim 15 wherein a holding step for holding a current supplied to the armature coils for a predetermined period is carried out between the first stepping step and the second stepping step, and a reverse exciting operation of reversing the current supplied to the armature coils is carried out between the holding step and the second stepping step.

17. A method of starting a motor according to claim 16 wherein the rotation number detecting step is carried out between the first stepping step and the holding step, when it is determined that the rotor is rotating in the rotation number detecting step, the accelerating/constant speed step is carried out after the first stepping step, and it determined that rotor is not rotating in the rotation number detecting step, the holding step, the second stepping step and the accelerating/constant speed step are carried out after the first stepping step.

18. A method of starting a motor according to claim 14 wherein a preliminary stepping step of supplying a preliminary stepping current of a relatively high frequency to the armature coils is carried out before the first stepping step.

19. A method of starting a motor according to claim 18 wherein a reverse exciting operation of reversing the current supplied to the armature coils is carried out between the preliminary stepping step and the first stepping step.

20. A method of starting a motor having a housing, a rotor rotatable relatively to the housing, a fluid dynamic pressure bearing interposed between the housing and the rotor, a permanent magnet mounted on the rotor and a stator equipped with armature coils, which comprises a preliminary stepping step for supplying a preliminary stepping current having a relatively high frequency to the armature coils and a stepping step for supplying a stepping current having a lower frequency than the frequency of the preliminary stepping current to be carried out after the preliminary stepping step, wherein slight vibrations are imparted to the rotor in the preliminary stepping step and the rotation of the rotor is substantially begun thereafter in the stepping step.

21. A method of starting a motor according to claim 20 wherein a reverse exciting operation of reversing the current supplied to the armature coils is carried out between the preliminary stepping step and the stepping step.

* * * * *